US010275446B2

(12) United States Patent
Allen et al.

(10) Patent No.: US 10,275,446 B2
(45) Date of Patent: *Apr. 30, 2019

(54) LINGUISTIC BASED DETERMINATION OF TEXT LOCATION ORIGIN

(71) Applicant: International Business Machines Corporation, Armonk, NY (US)

(72) Inventors: Corville O. Allen, Morrisville, NC (US); Roberto DeLima, Apex, NC (US); Andrew R. Freed, Cary, NC (US); Robert L. Nielsen, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,070

(22) Filed: Sep. 6, 2016

(65) Prior Publication Data

US 2017/0060832 A1 Mar. 2, 2017

Related U.S. Application Data

(63) Continuation-in-part of application No. 14/835,904, filed on Aug. 26, 2015, and a continuation-in-part of application No. 14/835,914, filed on Aug. 26, 2015.

(51) Int. Cl.
*G06F 17/20* (2006.01)
*G06F 17/27* (2006.01)
(Continued)

(52) U.S. Cl.
CPC ........ *G06F 17/274* (2013.01); *G06F 17/2211* (2013.01); *G06F 17/277* (2013.01);
(Continued)

(58) Field of Classification Search
CPC ............... G06F 17/30707; G06F 17/27; G06F 17/2785; G06F 17/3053
See application file for complete search history.

(56) References Cited

U.S. PATENT DOCUMENTS 5,231,671 A * 7/1993 Gibson .................... G10G 7/02
704/205
6,537,078 B2 * 3/2003 Jean ........................ G10H 1/361
434/307 A (Continued)

OTHER PUBLICATIONS

Chaski et al., "Who's at the Keyboard? Authorship Attribution in Digital Evidence Investigations," International Journal of Digital Evidence, Spring 2005, vol. 4, Issue 1, 14 pages.

(Continued)

*Primary Examiner* — Jialong He
(74) *Attorney, Agent, or Firm* — Nathan M. Rau

(57) ABSTRACT

A method and system for determining a location of origin and a time period in which a document was written is disclosed. A text is received and a set of linguistic characteristics for the text are identified. A set of possible locations and time periods for the text are determined based on the set of linguistic characteristics. A set of reference documents are used to determine a proximity rating for the text based upon a determination of how close the text is to the reference documents. The potential locations and time periods are ranked and returned for presentation.

20 Claims, 7 Drawing Sheets

(51) Int. Cl.
  *G06F 17/22* (2006.01)
  *G06F 17/30* (2006.01)
(52) U.S. Cl.
  CPC ........ *G06F 17/278* (2013.01); *G06F 17/2785* (2013.01); *G06F 17/30551* (2013.01); *G06F 17/3053* (2013.01); *G06F 17/30528* (2013.01); *G06F 17/30684* (2013.01); *G06F 17/30867* (2013.01)

(56) References Cited

U.S. PATENT DOCUMENTS

| | | | |
|---|---|---|---|
| 6,692,259 | B2 | 2/2004 | Kumar et al. |
| 7,895,148 | B2 | 2/2011 | Ma et al. |
| 8,504,550 | B2* | 8/2013 | Hall ..................... H04L 12/588 707/710 |
| 9,014,981 | B1 | 4/2015 | Gray et al. |
| 2003/0182310 | A1* | 9/2003 | Charnock ......... G06F 17/30716 |
| 2004/0006457 | A1 | 1/2004 | Dehlinger et al. |
| 2004/0162824 | A1 | 8/2004 | Burns |
| 2005/0234991 | A1 | 10/2005 | Marx et al. |
| 2007/0239433 | A1 | 10/2007 | Chaski |
| 2007/0287141 | A1* | 12/2007 | Milner ..................... G09B 5/00 434/307 A |
| 2007/0294199 | A1 | 12/2007 | Nelken et al. |
| 2008/0154848 | A1* | 6/2008 | Haslam ............. G06F 17/30011 |
| 2009/0024661 | A1 | 1/2009 | Kelliher |
| 2009/0049018 | A1 | 2/2009 | Gross |
| 2009/0300046 | A1 | 12/2009 | Abouyounes |
| 2010/0114562 | A1 | 5/2010 | Hutchinson et al. |
| 2010/0179754 | A1 | 7/2010 | Faenger et al. |
| 2010/0205525 | A1* | 8/2010 | Konrad ............. G06F 17/30707 715/256 |
| 2011/0213777 | A1* | 9/2011 | Sun ................... G06F 17/30707 707/740 |
| 2011/0264655 | A1 | 10/2011 | Xiao et al. |
| 2011/0301941 | A1 | 12/2011 | De Vocht |
| 2012/0078834 | A1* | 3/2012 | Sainath ............. G06F 17/30707 706/50 |
| 2012/0117082 | A1* | 5/2012 | Koperda ............. G06F 17/3053 707/748 |
| 2012/0271624 | A1 | 10/2012 | Chen et al. |
| 2013/0024407 | A1* | 1/2013 | Thompson ........ G06F 17/30707 706/12 |
| 2013/0189652 | A1 | 7/2013 | Marttila |
| 2015/0309974 | A1 | 10/2015 | Brav et al. |

OTHER PUBLICATIONS

Wing et al., "Simple Supervised Document Geolocation with Geodesic Grids," Proceedings of the 49th Annual Meeting of the Association for Computational Linguistics: Human Language Technologies—vol. 1, pp. 955-964, Association for Computational Linguistics, 2011.
Zhao, Y., "Effective Authorship Attribution in Large Document Collections," PhD thesis, RMIT University, Australia, Dec. 20, 2007, 261 pages.
De Vel, O., "Minig E-mail Authorship," Proc. Workshop on Text Mining, ACM International Conference on Knowledge Discovery and Data Mining (KDD '2000), 2000, 7 pages.
Juola, P., "Authorship Attribution," Foundations and Trends in Information Retrieval, 2006, pp. 233-334, vol. 1, No. 3, DOI: 100.1561/1500000005.
Iqbal et al., "A unified data mining solution for authorship analysis in anonymous textual communications," Information Sciences 231 (2013) 98-112.
Corney, M., "Analysing E-mail Text Authorship for Forensic Purposes," Diss. for Master of Information Technology, Queensland Univerisity of Technology, 2003, 181 pages.
Boguraev et al., "TimeML-Compliant Text Analysis for Temporal Reasoning," IJCAI '05: Proceedings of the 19th International Conference on Artificial Intelligence, 2005, pp. 1-7. http://www.ijci.org/papers/1202.pdf.
Kolya et al., "Event-Time Relation Identification Using Machine Learning and Rules," Text, Speech and Dialogue: Lecture Notes in Computer Science, Chapter 10, vol. 6231, pp. 117-124, 2010, © Springer-Verlag Berlin Heidelberg 2010.
Molgaard et al., "Temporal Analysis of Text Data Using Latent Variable Models," MLSP 2009: IEEE International Workshop on Machine Learning for Signal Processing, Sep. 2009, 6 pages. http://www2.imm.dtu.dk/pubdb/views/edoc_download.php/5803/pdf/imm5803.pdf.
Setzer et al., "The Role of Inference in the Temporal Annotation and Analysis of Text," Language Resources and Evaluation (2005) 39: 243-265, © Springer 2006. DOI: 10.1007/s10579-005-7885-4.
Sun et al., "Temporal reasoning over clinical text: the state of the art," Journal of the American Medical Informatics Association, 20: 814-819, 2013. DOI: 10.1136/amiajnl-2013-001760.
Vicente-Diez et al., "An empirical approach to a preliminary successful identification and resolution of temporal expressions in Spanish news corpa," LREC '08: Proceedings of the Sixth International Conference on Language Resources and Evaluation, pp. 2153-2158, 2008, Morocco. http://www.lllf.uam.es/ING/TimeEx.pdf.
Weiser et al., "Automatic Identification of Temporal Information in Tourism Web Pages," LREC '08: Proceedings of the Sixth International Conference on Language Resources and Evaluation, pp. 127-131, May 2008, Morocco. http://www.lrec-con/org/proceedings/lrec2008/pdf/44_paper.pdf.
Dalli et al., "Automatic Dating of Documents and Temporal Text Classification," Proceedings of the Workshop on Annotating and Reasoning about Time and Events, Jul. 2006, pp. 17-22, Association for Computational Linguistics.
Kumar et al., "Dating Texts without Explicit Temporal Cues," arXiv: preprint arXiv:1211.2290, Nov. 2012, 12 pages.
Niculae et al., "Temporal Text Ranking and Automatic Dating of Texts," Proceedings of the 14th Conference of the European Chapter of the Association for Computational Linguistics, Apr. 2014, pp. 17-21, Association for Computational Linguistics.
Chambers, N., "Labeling Documents with Timestamps: Learning from their Time Expressions," Proceedings of the 50th Annual Meeting of the Association for Computational Linguistics, Jul. 2012, pp. 98-106, Association for Computational Linguistics.
Tilahun, G., "Statistical Methods for Dating Collections of Historical Documents," PhD Thesis, Department of Statistics, University of Toronto, 2011, 178 pages.
Kanhabua et al., "Using Temporal Language Models for Document Dating," Machine Learning and Knowledge Discovery in Databases, vol. 5782 of Lecture Notes in Computer Science, 2009, pp. 738-741, © Springer-Verlag Berlin Heidelberg 2009.
Ciobanu et al., "Temporal classification for historical Romanian texts," Proceedings of the 7th Workshop on Language Technology for Cultural Heritage, Social Sciences, and Humanities, Aug. 2013, pp. 102-106, Association for Computational Linguistics.
Pouliquen et al., "Geographical Information Recognition and Visualization in Texts Written in Various Languages," Proceedings of the 2004 ACM Symposium on Applied Computing, pp. 1051-1058, ACM, 2004.
Roller et al., "Supervised Text-based Geolocation Using Language Models on an Adaptive Grid," Proceedings of the 2012 Joint Conference on Empirical Methods in Natural Language Processing and Computational Natural Language Learning, pp. 1500-1510, Association for Computational Linguistics, 2012.
Allen et al., "Linguistic Based Determination of Text Creation Date," U.S. Appl. No. 14/835,904, filed Aug. 26, 2015.
Allen et al., "Linguistic Based Determination of Text Location Origin," U.S. Appl. No. 14/835,914, filed Aug. 26, 2015.
Allen et al., "Linguistic Based Determination of Text Creation Date," U.S. Appl. No. 15/132,945, filed Apr. 19, 2016.
Accelerated Examination Support Document dated Apr. 7, 2016 for U.S. Appl. No. 15/132,945, 14 pages.
Allen et al., "Linguistic Based Determination of Text Location Origin," U.S. Appl. No. 15/132,969, filed Apr. 19, 2016.
Accelerated Examination Support Document dated Apr. 15, 2016 for U.S. Appl. No. 15/132,969, 13 pages.

(56) References Cited

OTHER PUBLICATIONS

List of IBM Patents or Patent Applications Treated as Related, dated Sep. 6, 2016, 2 pages.

* cited by examiner

US 10,275,446 B2

LINGUISTIC BASED DETERMINATION OF TEXT LOCATION ORIGIN

CROSS-REFERENCE TO RELATED APPLICATIONS

This application is a continuation in part of co-pending U.S. patent application Ser. No. 14/835,904 filed Aug. 26, 2015, and a continuation in part of co-pending U.S. patent application Ser. No. 14/835,914 filed Aug. 26, 2015. The aforementioned related patent applications are herein incorporated by reference in their entirety.

BACKGROUND

The present disclosure relates to text analysis, and more specifically, to the determination of the location of origin of a text and the determination of the creation date of the text.

Text analysis is a detailed examination of the elements and structure of a text document to derive information related of the text in question. Text may be broken down and examined in various ways. Various things may be learned about different aspects of a text through text analysis, and various conclusions may be reached.

SUMMARY

According to embodiments of the present disclosure, a computer implemented natural language processing method includes receiving a text. The method also includes identifying a set of linguistic characteristics contained in the text, where linguistic characteristics include grammatical, syntactic, and idiomatic features of the text. The method also includes determining a plurality of locations of origin in which the text was potentially written and/or the time period in which the text was potentially written based on the set of linguistic characteristics. The method also includes retrieving a set of reference documents for each location of origin in the plurality of locations of origin, in response to the determining the plurality of locations in which the text was potentially written. The method also includes retrieving a set of reference documents for each time period in the plurality of time periods in response to the determining the plurality of time periods in which the text was potentially written. The method also includes producing a set of proximity scores by performing a set of proximity checks using the set of linguistic characteristics, the set of reference documents, and the text, wherein the proximity checks analyze how often and how close linguistic characteristics are to one another. The method also includes ranking the plurality of locations of origin and the plurality of time periods based on the set of proximity scores. The method also includes returning a set of one or more ranked locations of origin of the plurality of locations of origin, and returning a set of one or more ranked time periods of the plurality of time periods. Other embodiments relate to a system and a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
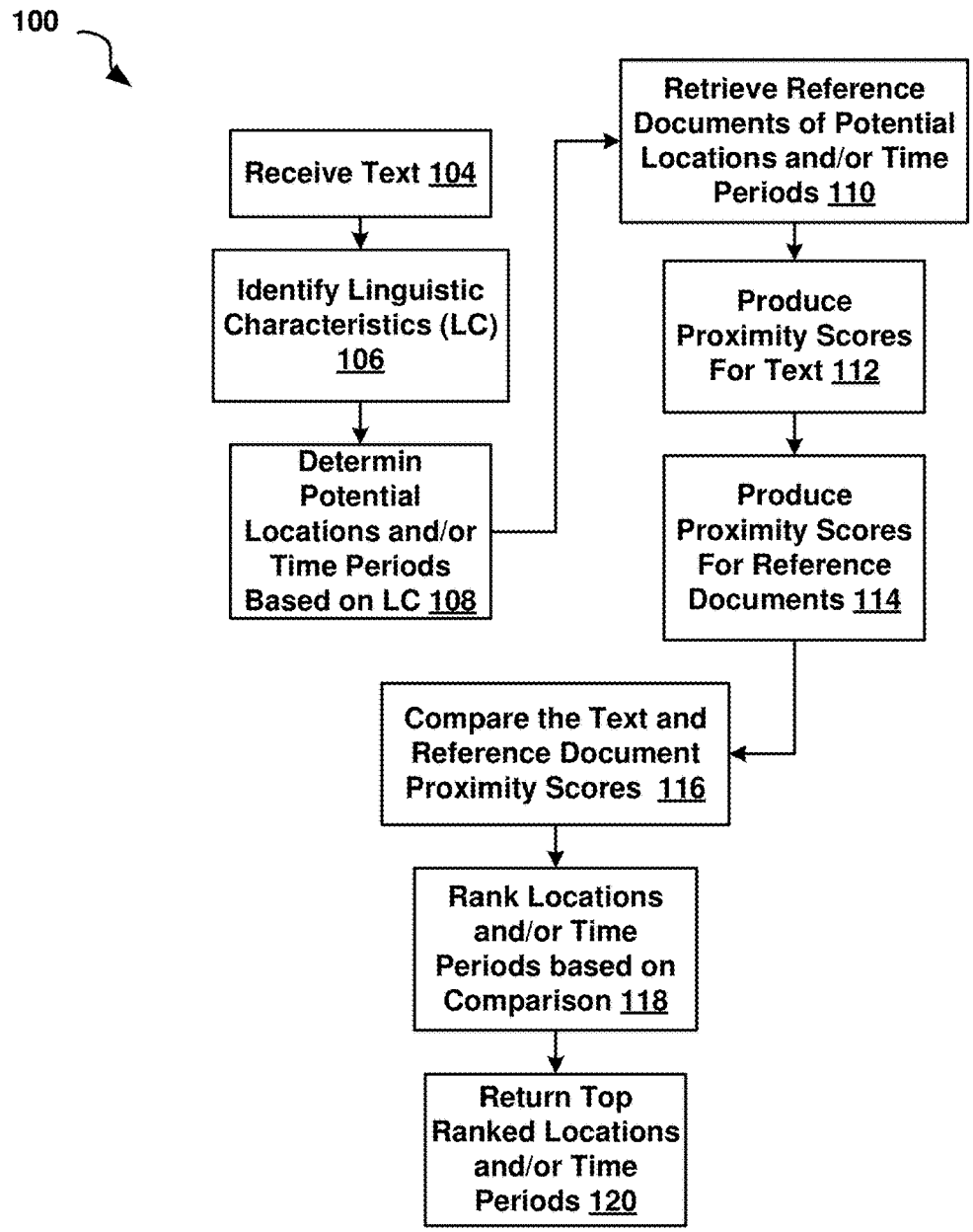
FIG. 1 depicts a general flowchart of determining the location of origin and/or time period of a text, according to various embodiments.

While embodiments described herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to text analysis, and more specifically, to the determination of the location of origin of a text. While the present disclosure is not necessarily limited to such applications, various aspects of the disclosure may be appreciated through a discussion of various examples using this context.

The location of origin of a text is a piece of data that may give one various insights into the text, including the context in which it was created, among other things. The location of origin is the place where the text was written. A set is any number of a particular thing. Existing processes may not faithfully reproduce the location of origin of the text. Further, the date or time period a text was written is a piece of data that may also give various insights into the text, including the context in which it was created, among other things. A time period is a set of dates. Existing processes may not faithfully reproduce the date of the text. For example, many systems scan documents imported with optical character recognition (OCR) or text snippets copied or pasted from other sources. Additionally, a text may originate from a transcription of spoken word, which may not include a location or origin on the text itself.

The present disclosure describes a computer, system, or methods, parsing out linguistic characteristics from a text. From analysis of those linguistic features, potential locations of origin that text originated from are ranked by which are the most likely. Further, this analysis potential time periods that the text originated from are ranked by which are the most likely.

The present disclosure discloses various methods, systems, and computer program products configured to accurately locate the origin of a text by analyzing the text and parsing it into pieces that represent different linguistic characteristics, according to various embodiments. These linguistic characteristics are compared against numerous reference documents, or "gold set" documents, permitting the ranking of potential locations of origin of the text, according to various embodiments. The present disclosure further discusses various methods, systems, and computer program products configured to accurately date a text by analyzing the text and parsing it into pieces that represent different linguistic characteristics, according to various embodiments. These linguistic characteristics are compared against numerous reference documents, or "gold set" documents, permitting the ranking of the plurality of time periods of the text, according to various embodiments.

According to various embodiments, dialect and language characteristics may be used to determine where a text (e.g., a document, transcript, blog post, article, etc.) was written. As described herein, a computer may determine where the text was written by associating the linguistic characteristics with a location of origin. Then, the computer cross-references the linguistic characteristics against other highly correlated similar statements across a broad collection of texts to narrow down the potential locations of origin. Similar statements may include spelling variations, phrasing variations, and other indicators. Examples of texts may include, but are not limited to, social media, literature, government documents, journals, and textbooks. Some of these texts are noted either by an explicit publication city or country, visible or otherwise. The present disclosure could be used to supplement such analysis, according to various embodiments.

Various described processes may utilize a computer that is configured to process key features of dialect changes over small variations of region or location of origin. Variations in location of origin may be defined in terms of social language. World events may also aid in determining the location of origin of a text and/or determining the date a text was created, as various events utilize a very particularized form of language, or create a new phrase altogether for specific locations of origin in the world. Various changes in the language may also be taken into consideration. The changes in the language are often in use of phonology, grammar, vocabulary, jargons, slangs, digital-identifiers (such as hashtags), short hand, and acronyms.

For example, if how a word was pronounced, the way it was used in a sentence, or the meaning of the word changed, then such moments would be markers for change in the language as a whole. The addition of terms like "meme," "I've made a huge mistake," and "courage wolf" into the language can be found and categorized based on the location of origin of the first existence of the term and the definition of the words. Likewise, abbreviations, shorthand notation, initials, and acronyms such as "ALS" for "amyotrophic lateral sclerosis" and "BTW" for "by the way" are distinct and the popularity of their use and their meaning can be tracked. Similarly, certain jargons and slang, such as "not enough sense to pound sand down a rat hole," which are prominently used at particular locations of origin or came into existence at particular times. Some phrases may virtually cease usage outside of a certain location of origin or time periods, creating a presumption that if a phrase is found, it is highly likely that the text containing the phrase was created in that specific location of origin and/or time period. Another example would be particular phrases, such as "ducky shincracker," were predominately used in particular locations of origin or time periods and could be weighed against other terms from other locations of origin and time periods in the document.

A set of dialect or linguistic terms, phrases, and forms may be categorized and noted, based on a set of existing documents. When found, the location of origin could be as small as a county or city, or less, to as large states or countries for more obscure or less documented characteristics. Further, when this set of terms, phrases and forms are found, the duration or range could be as small as a week or day, or less, for social data, to as large as bands of years or decades for more obscure or less documented characteristics.

According to various embodiments, described processes may be advantageous as a language identification service. The language identification service may serve as a document origin service and/or document dating service. The language identification service may take a small portion of a document and attempt to categorize it into locations of origin based on the linguistic characteristics. The language identification service may further take a small portion of a document and attempt to categorize it into short duration time periods based on the linguistic characteristics. Together both the time period and the location of origin of the document may be categorized.

In one embodiment, a set of dialect or linguistic terms, phrases, and forms are categorized and then noted, based on a set of existing documents or training data. The form, the linguistic format of the phrases, is denoted. When found, the forms are then used to train a system to match against a specific location of origin where the document would likely have been written or originated, according to various embodiments. Further, when found, the forms are then used to train a system to match against a specific time period where the document would likely have been written or originated, according to various embodiments. This duration or range could be as small as a month or less for social data.

The linguistic characteristics may be checked against a hundred, thousand, million, or more reference texts depending on the location of origin and available resources. The more data available for a given linguistic characteristic, the more precise the computer can be, according to various embodiments. The relation between available references and the preciseness of the location of origin may be most pronounced in social data due to numerous iterations and highly specific linguistic characteristics, which may be related to news events or popular culture.

FIG. 1 depicts a general flowchart 100 of determining the location of origin of a text and the date the text was created, according to various embodiments.

A computer begins the process by receiving a text at operation 104. According to various embodiments, the text may include, but is not limited to, government documents, textbooks, literature, poetry, personal letters, tweets, various texts, instant messages, other documents, or anything on which language is memorialized or written. A greater quantity of text, and therefore a greater quantity of words and characters, would generally lead to more linguistic characteristics, and more comparison points further along the process for scoring. In other words, more text to analyze may lead to a more accurate analysis of a text. However, distinctive characteristics may have an even greater impact on the accuracy of analysis, especially if a highly specific and/or short-lived term is found in the text.

Then, the computer analyzes the text, parses the text, and identifies what language the text is written in, and what linguistic characteristics are contained within the text at operation 106 using natural language processing and/or keyword searches, according to various embodiments. Linguistic characteristics may be linguistic, grammatical, syntactic, or idiomatic features of the text. These linguistic characteristics are either inputted by a user or learned through natural language processing. Examples of these linguistic characteristics can be found in embodiments described in FIG. 2, for example, and may generally relate to word choice and word use, as described herein.

Based on the linguistic characteristics identified, the computer determines a set of potential locations of origin and/or a set of potential time periods at operation 108. Each linguistic characteristic is associated with different locations of origin and/or time periods. The set of potential locations of origin includes all locations of origin that match with at least one identified characteristic from the text. The set of potential time periods includes all time periods that match with at least one identified characteristic from the text.

Additionally, each location of origin and time period has a set of reference documents that may be used as example documents representing those locations of origin and/or time periods. The reference documents may be stored on the computer or retrieved from a network or the internet. The reference documents for each of those locations of origin and/or time periods are gathered at operation 110. For each location of origin that has an identified linguistic characteristic, the computer retrieves all of the reference documents associated with that location of origin for use in scoring. The computer runs a preliminary check of all locations of origin in which an identified linguistic characteristic is found at operation 106. For each time period that has an identified linguistic characteristic, the computer retrieves all of the reference documents associated with that time period for use in scoring. The computer runs a preliminary check of all time periods in which an identified linguistic characteristic is found at operation 106.

Once the computer has both the text and the reference documents, the computer performs a series of proximity checks comparing the linguistic characteristics with the text that produces a set of proximity scores at operation 112. Proximity checks analyze how often and how close linguistic characteristics are to one another. The proximity checks may assess how the linguistic characteristics are used and placed within the text. The proximity score may examine how far a linguistic character is placed from another in the text or how many linguistic characteristics are present with certain criteria. The more prominent those linguistic characteristics are, and the closer the linguistic characteristics are, then therefore the higher the score from the proximity check. From the proximity checks, the computer produces a proximity score for the text at operation 112, which indicates how weak or strong an identified linguistic characteristic is used in the text.

Similarly, the computer performs a series of proximity checks comparing the linguistic characteristics with the reference documents that produces proximity scores for each of the reference documents at operation 114. The proximity checks could look at how the linguistic characteristics are used and placed. From the proximity checks, the computer produces a proximity score for each of the reference documents at operation 114, which indicates how weak or strong an identified linguistic characteristic is used in each of the reference documents.

Using the proximity scores from the text document and the proximity scores for each of the reference documents, the computer compares the values at operation 116. The more the two values correlate, then the more the linguistic characteristic is being similarly used and placed in the reference documents and the text document. The computer ranks the locations of origin and/or time periods at operation 118. For location of origin, the higher the correlation of the proximity scores of the reference documents and the text, then the higher the ranking of the locations of origin. Similarly, the lower the proximity scores of the reference documents and the text, then the lower the ranking of the locations of origin. All of the locations of origin are ranked based on their scores at operation 118, according to various embodiments. For periods of time, the higher the correlation of the proximity scores of the reference documents and the text, then the higher the ranking of the time periods. Similarly, the lower the proximity scores of the reference documents and the text, then the lower the ranking of the time periods. All of the time periods are ranked based on their scores at operation 118, according to various embodiments.

The computer returns a list of the top ranked potential locations of origin and/or time periods of the document at operation 120. The returned list of ranked locations of origin and/or time periods is based on the ranking, which are in turn based on the scores. According to various embodiments, the returned list may be as long as the user sets. For example, the list could be the single highest ranked time period, the top three, or the top 100. The list is returned via an audio or visual user interface, according to various embodiments.

Figure 2:
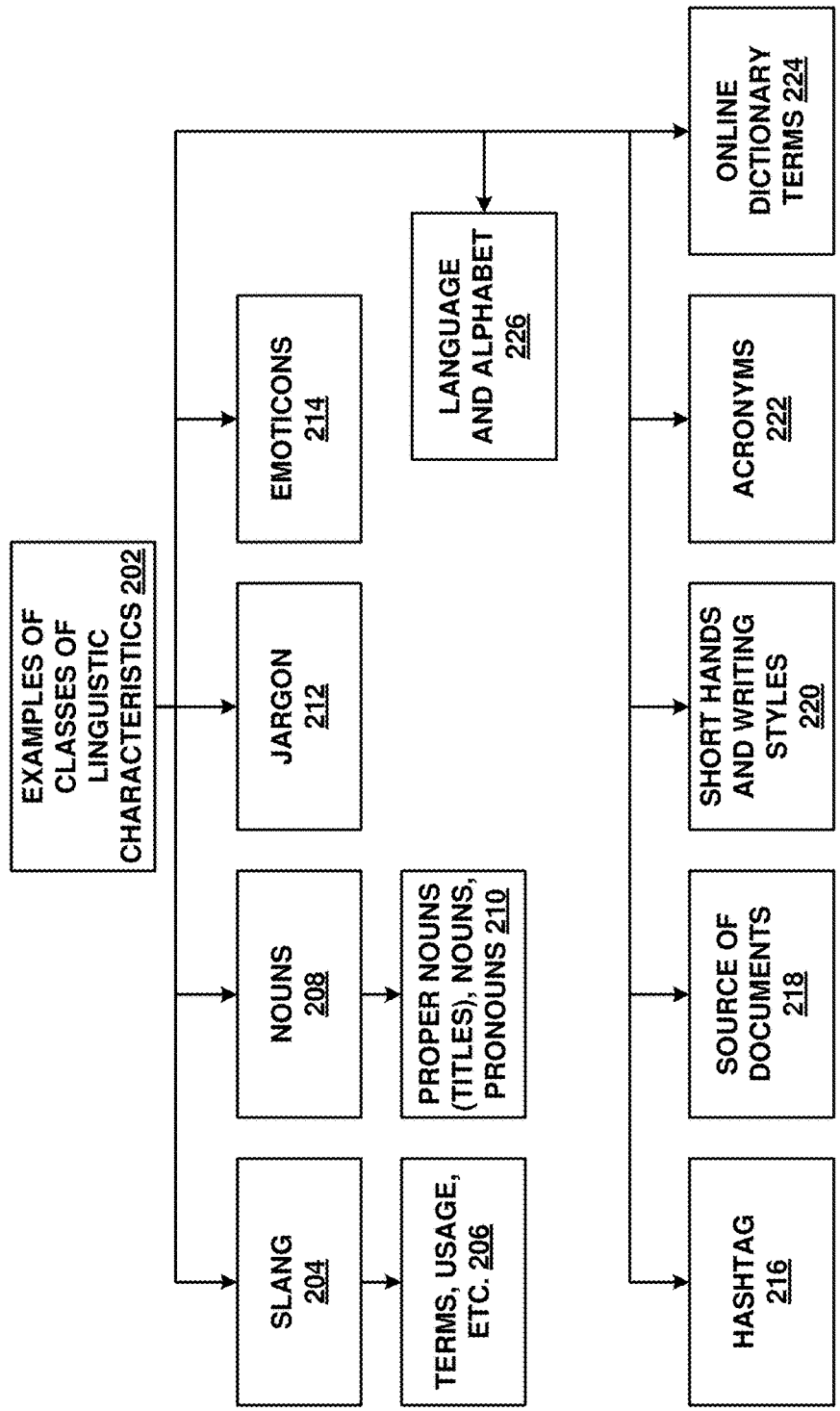
FIG. 2 depicts examples of classes of linguistic characteristics, according to various embodiments.

FIG. 2 depicts examples of classes of linguistic characteristics 202, according to various embodiments.

Classes of linguistic characteristics may include, but are not limited to: slang terms 204, nouns 208, jargon 212, emoticons 214, hashtags 216, sources of documents 218, shorthand writing and styles 220, acronyms 222, online dictionary resources 224, and the language and alphabet of the text 226.

Slang terms 204 are expressions that not found traditionally in a language. Slang terms include, but are not limited to, the terms and usage 206 of those expressions. For example, in the 1940s, the term "ducky shincracker" referred to someone who is talented at dancing, and the term is not often heard nor written outside of the 1940s, leading to a higher correlation with the 1940s.

Nouns 208 are words used to identify particular people, places, or things. Nouns include, but are not limited to, proper nouns (titles), nouns, and pronouns 210. For example, in the sentence, "Mr. Wash goes to Smithington," "Mr." is a title, "Wash" is a proper noun for a person's name, and "Smithington" is a proper noun for a place's name.

Jargon 212 is a word or expression that specialists and professionals in a specific field used to denote things specific to their field. For example, a police officer would refer to someone suspected for a crime as a "suspect," or a specialist in Greek culture could be familiar with the word "omphaloskepsis," which is of Greek origin.

Emoticons 214 are representations of facial expressions created by combining letter, numbers, and other characters a computer can create. For example ":)" is used to represent a smiling face, and similarly ":(" is used to represent a frowning face. The design of emoticons may become more abstract and creative using other characters, such as ">:[" representing an angry face.

Hashtags 216 are sets of words generally preceded by a "#," which denote specific groups or topics. For example, hashtags such as "#waitforit" and "#fail" refer to media and popular culture, whereas "#cafe" refers to the location the hashtag originates from.

Sources of documents 218 include, but are not limited to, the author, publisher, place of origin, and editor. For example, English word choice and/or sentence structure in the United States would vary slightly from word choice in the United Kingdom and even still from word choice in India. These differences may be subtle characteristics that may also be analyzed to determine a geographic origin of a text.

Shorthand writing and styles 220 are alternate forms of writing and notation used to be more efficient or clearer. Similarly, acronyms 222 are abbreviations of nouns to sets of letters given the same meaning. For example, ALS for "amyotrophic lateral sclerosis" and "BTW" for "by the way" are smaller on the page, easier to type, and easier to read, which make them convenient in general use.

Online dictionary resources 224, and other online encyclopedias, are databases found on the internet that have compiled and elaborated on words, terms, and expressions. For example, "Wikipedia" often has an entry on most topics, and online dictionaries have numerous definitions for all words. Other databases, such as search engines, encyclopedias, and academic publications could be used depending on the subject matter and specificity needed.

The language and alphabet of a text 226 are the words, letters, and spelling of words that are used. For example, in the United States, "color" would be used, whereas in the United Kingdom, "colour" is preferred. Whether the text is written in English, Chinese, or any other language may be an important feature of the text. Additional embodiments could employ a computer, as described herein, to identify sources of the text documents. As noted, the sources of documents 218 include, but are not limited to, the author, publisher, location of origin, region, and editor. By identifying linguistic characteristics that are more prominent in certain regions or locations of origin, the process could create a ranked list of the top locations of origin of the document.

In one embodiment, the computer identifies the source of the document. The computer would emphasize regional or geographic specific words over time specific words. The computer would parse out and analyze the linguistic characteristics as in previous embodiments. The computer would have a set of reference documents for each possible region in the set of regions. How specific the computer is could be based on those reference documents, allowing for target locations to be a band of countries, a single country, a band of states or counties, or a single state or county. The computer ranks locations and regions by the correlation and proximity scores of those locations and regions. Finally, the computer returns a ranked list of the most likely locations of origin of the text.

For example, if a given text document makes reference to "hot dish" recipes, "loons," and "the Twin Cities," then the computer could identify those as linguistic characteristics more prominent in the upper Midwest of the United States of America, especially the state of Minnesota. This embodiment uses a similar computer as to the dating computer, and changes the parameters slightly.

In another example, the phrase "not enough sense to pound sand down a rat hole" was prominent in the state of New York. The phrase is not often found outside of New York. The computer could identify the phrase and note that the text, or at least the author, has a heavier correlation with the state of New York. Because of this correlation, the computer would rank New York higher.

Similarly, if a text contains the phrase "mony a mickle maks a muckle" as well as the word "dodderman," then the computer would identify both as linguistic characteristics. "Mony a mickle maks a muckle" is a regional phrase from Scotland, and "dodderman" is a regional slang word from Norfolk or Suffix. Based on this information, the computer would rank the source of the text to be from the mainland of the United Kingdom, but does not have enough information to clearly differentiate between Scotland, Norfolk, and Suffix. To get more specific, the computer would require more reference documents or more linguistic characteristics to analyze. Thus, the computer returns a suggested target location of origin of mainland United Kingdom.

Figure 3:
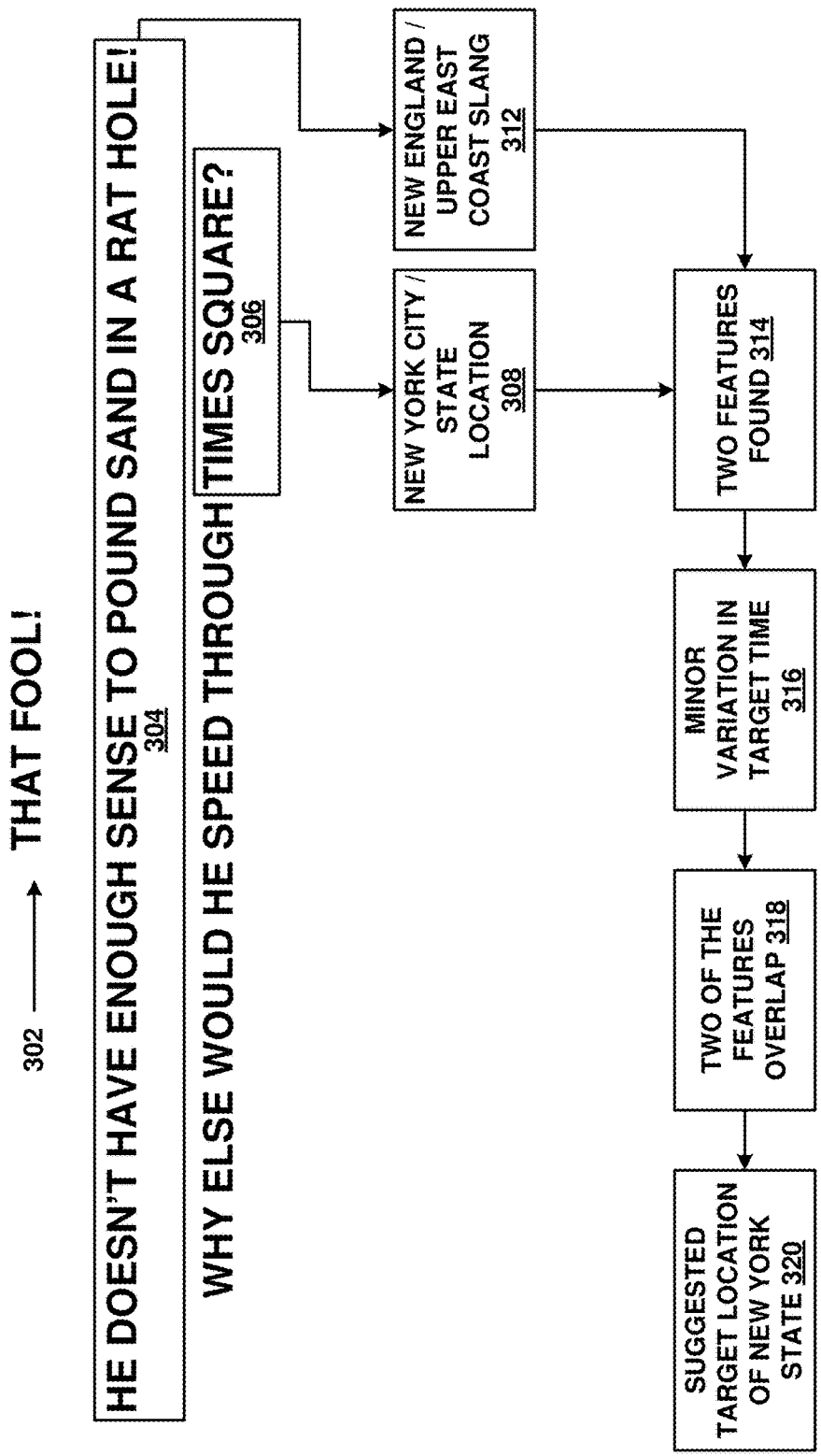
FIG. 3 depicts the use of proximity checks on an example sentence, according to various embodiments for locations.
Figure 4:
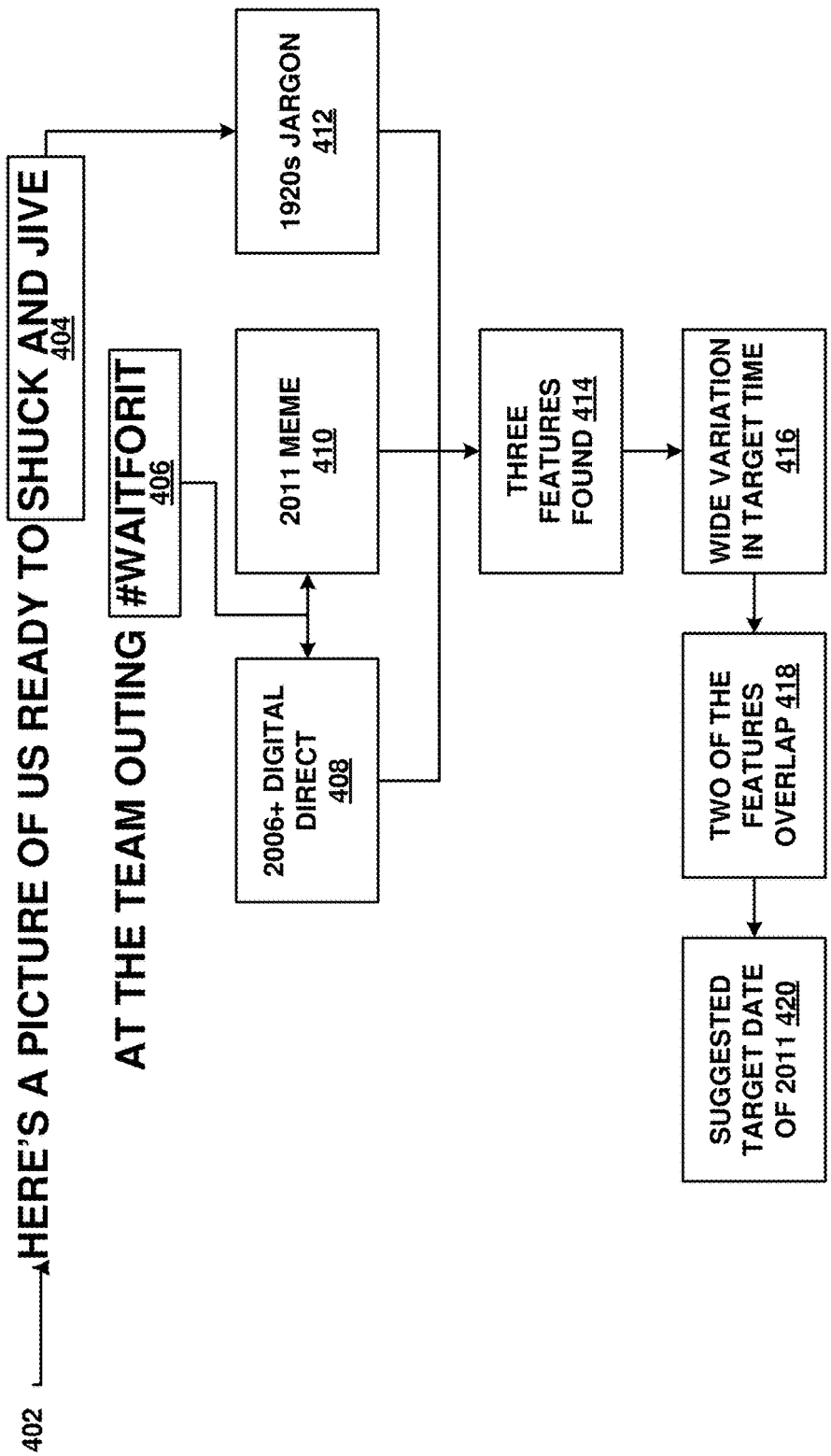
FIG. 4 depicts the use of proximity checks on an example sentence, according to various embodiments for time periods.

For purposes of this discussion the process for the proximity checks will be discussed with respect to FIG. 3 and FIG. 4. FIG. 3 depicts the use of proximity checks on an example sentence 302, according to various embodiments for location. FIG. 4 depicts the use of proximity checks on an example sentence 402, according to various embodiments for a time period.

In one embodiment, one of the proximity checks may be a proximity check based on dating of the linguistic characteristic and how close the features for the text are, by date. A proximity check based on dating would show a likelihood the linguistic characteristics relate based on the locations of the linguistic characteristics within the text. This embodiment may similarly be done with the reference documents.

According to various embodiments, one of the proximity checks may be a proximity check based on the placement of the linguistic characteristics in the text and how close those are in placement to any other characteristics found within the text. A proximity check based on placement would show a likelihood the documents correlate based the placement use of the linguistic characteristics. These embodiments may similarly be done with the reference documents.

In the example sentence 302, the computer identifies two linguistic characteristics out of the example sentence 302: "HE DOESN'T HAVE ENOUGH SENSE TO POUND SAND DOWN A RAT HOLE" at operation 304; and "TIMES SQUARE" at operation 306. The computer registers "HE DOESN'T HAVE ENOUGH SENSE TO POUND SAND DOWN A RAT HOLE" as New England and upper East Coast slang at operation 312. The computer registers "TIMES SQUARE" as being a prominent location in New York City at operation 308. The computer has found two features at operation 314, and notes an overlap in the target location of origin at operation 316 since there is information indicating the upper East Coast as well as New York City. Thus, the computer suggests a target location of origin of New York City at operation 320 due to the agreement in location of origin of the linguistic characteristics. Also ranked would be New York State, and neighboring states such as New Jersey.

Referring to FIG. 4, in one embodiment, one of the proximity checks may be a proximity check based on dating of the linguistic characteristic and how close the features for the text are, by date. A proximity check based on dating would show a likelihood the linguistic characteristics relate based on the time periods of the linguistic characteristics. This embodiment may similarly be done with the reference documents.

According to various embodiments, one of the proximity checks may be a proximity check based on the placement of the linguistic characteristics in the text and how close those are in placement to any other characteristics found within the text. A proximity check based on location would show a likelihood the documents correlate based the placement use of the linguistic characteristics. These embodiments may similarly be done with the reference documents.

In the example sentence 402, the computer identifies two linguistic characteristics out of the example sentence 402: "SHUCK AND JIVE" at operation 404; and "#WAITFORIT" at operation 406. The computer registers "SHUCK AND JIVE" as 1920s jargon at operation 412. The computer registers "#WAITFORIT" as being a year 2006-onward digital direct at operation 408 in addition to being a prominent meme in the year 2011 at operation 410. The computer registers "#WAITFORIT" due to the use of the "#" symbol, which the system recognizes as a hashtag indicator, as well as the location of the linguistic characteristic's use at the end of the sentence as a block, another recognized indicator of a hashtag. The computer has found three features at operation 414, and notes a wide variation in the target time at operation 416 since there is information indicating the 1920s as well as the late 2000s. The computer recognizes that two of the three features overlap at operation 418 since hashtags are used from 2006 onward and "#WAITFORIT" was specifically prominent in 2011. Thus, the computer suggests a target date of 2011 at operation 420 due to the agreement in time of the linguistic characteristics.

Figure 5:
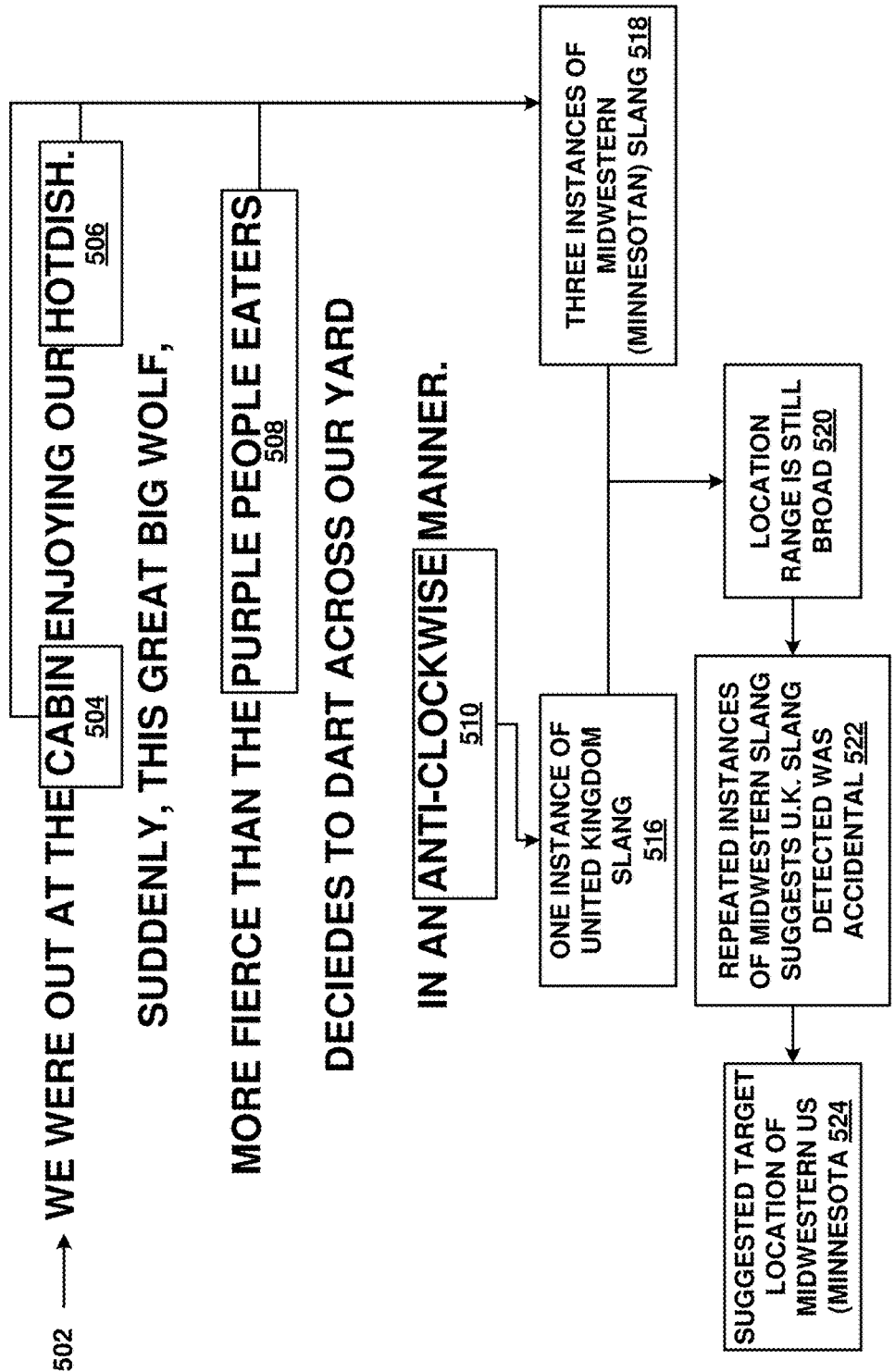
FIG. 5 depicts an embodiment of a disclosed process, including the use of proximity checks on an example sentence, according to various embodiments for a location.

FIG. 5 depicts an embodiment of a disclosed process, including the use of proximity checks on an example sentence 502, according to various embodiments for a location. Additionally, FIG. 5 depicts an example of the disclosed process when an accidental detection occurs at operation 522.

In the example sentence 502, six linguistic characteristics have been identified: "CABIN" 504 is registered as Midwestern slang at operation 518; "HOTDISH" 506 is registered as Midwestern slang, specifically Minnesotan, at operation 518; "PURPLE PEOPLE EATERS" 508 is registered as Midwestern slang, specifically Minnesotan, at operation 518; and "ANTI-CLOCKWISE" 510 is registered as United Kingdom jargon at operation 518. The computer notes this range as being broad at operation 520. The heavy indication that the document is from the Midwest, specifically Minnesota, due to the numerous instances of slang within close proximity to one another leads the computer to consider that the single instance of United Kingdom jargon was accidental at operation 522 and should not be counted. The computer records that the text could be from the United Kingdom, but notes that there is a significantly higher correlation with the Midwest, specifically Minnesota, due to the amount of instances of Minnesota slang and their proximity to one another. This higher correlation with the Midwest leads the computer to consider that the instance of United Kingdom slang was accidental. Finally, the computer suggests a target location of origin of somewhere in the Midwest, specifically Minnesota, at operation 524, but also has the United Kingdom onward as a lower ranked possibility.

Figure 6:
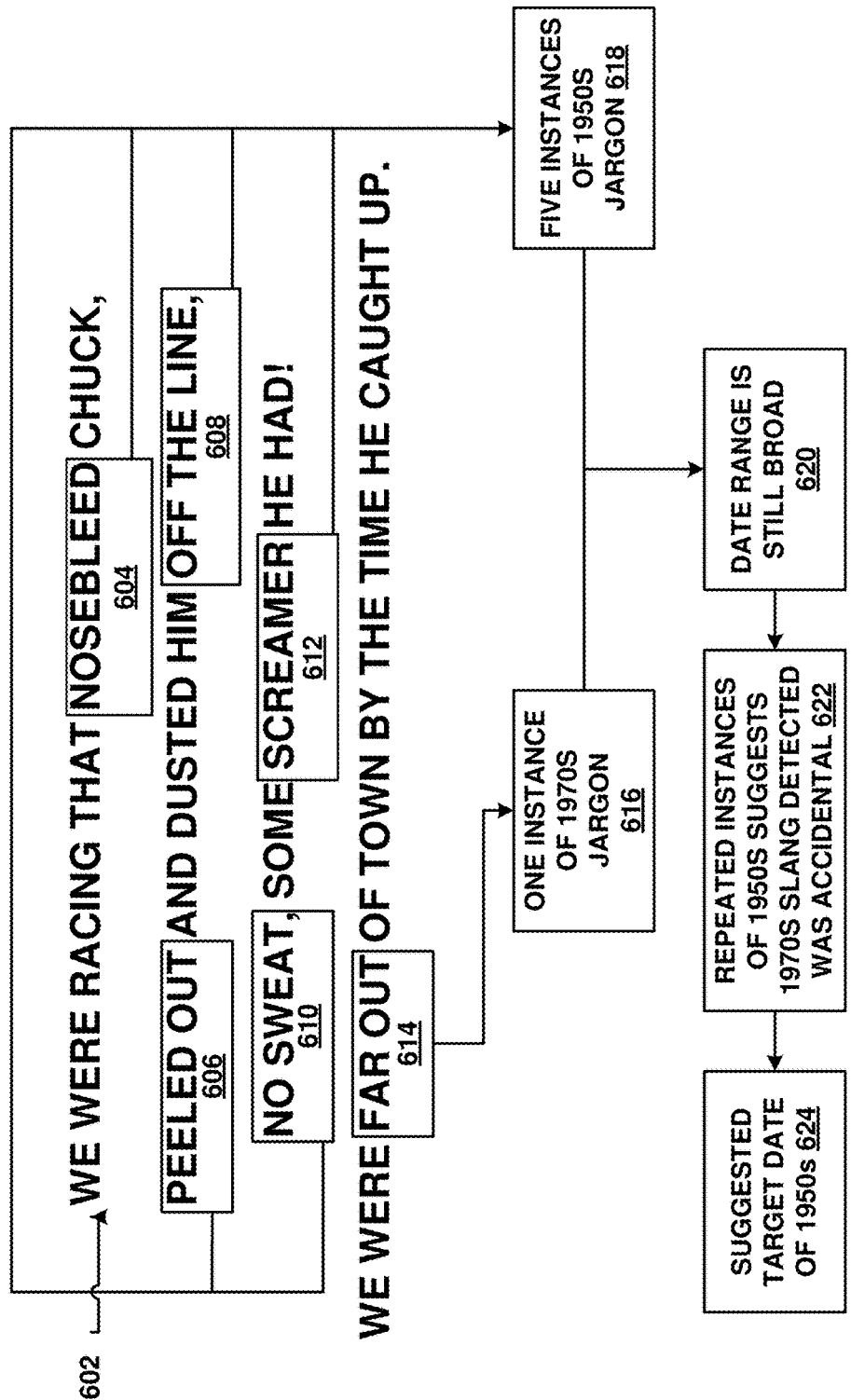
FIG. 6 depicts an embodiment of a disclosed process, including the use of proximity checks on an example sentence, according to various embodiments for a time period.

FIG. 6 depicts an embodiment of a disclosed process, including the use of proximity checks on an example sentence 602, according to various embodiments for a time period. Additionally, FIG. 6 depicts an example of the disclosed process when an accidental detection occurs at operation 622.

In the example sentence 602, six linguistic characteristics have been identified: "NOSEBLEED" 604 is registered as 1950s slang at operation 618; "PEELED OUT" 606 is registered as 1950s slang at operation 618; "OFF THE LINE" 608 is registered as 1950s slang at operation 618; "NO SWEAT" 610 is registered as 1950s slang at operation 618; "SCREAMER" 612 is registered as 1950s slang at operation 418; and "FAR OUT" 614 is registered as 1970s slang at operation 616. The computer notes this range as being broad at operation 620. The heavy indication that the document is from the 1950s due to the numerous instances of 1950s slang within close proximity to one another leads the computer to consider that the single instance of 1970s slang was accidental at operation 622 and should not be counted. The computer records that the text could be from 1970s onward, but notes that there is a significantly higher correlation with the 1950s do to the number of instances of 1950s slang and their proximity to one another. This higher correlation with the 1950s leads the computer to consider that the instance of 1970s slang was accidental. Finally, the computer suggests a target date of sometime in the 1950s at operation 624, but also has 1970s onward as a lower ranked possibility.

Figure 7:
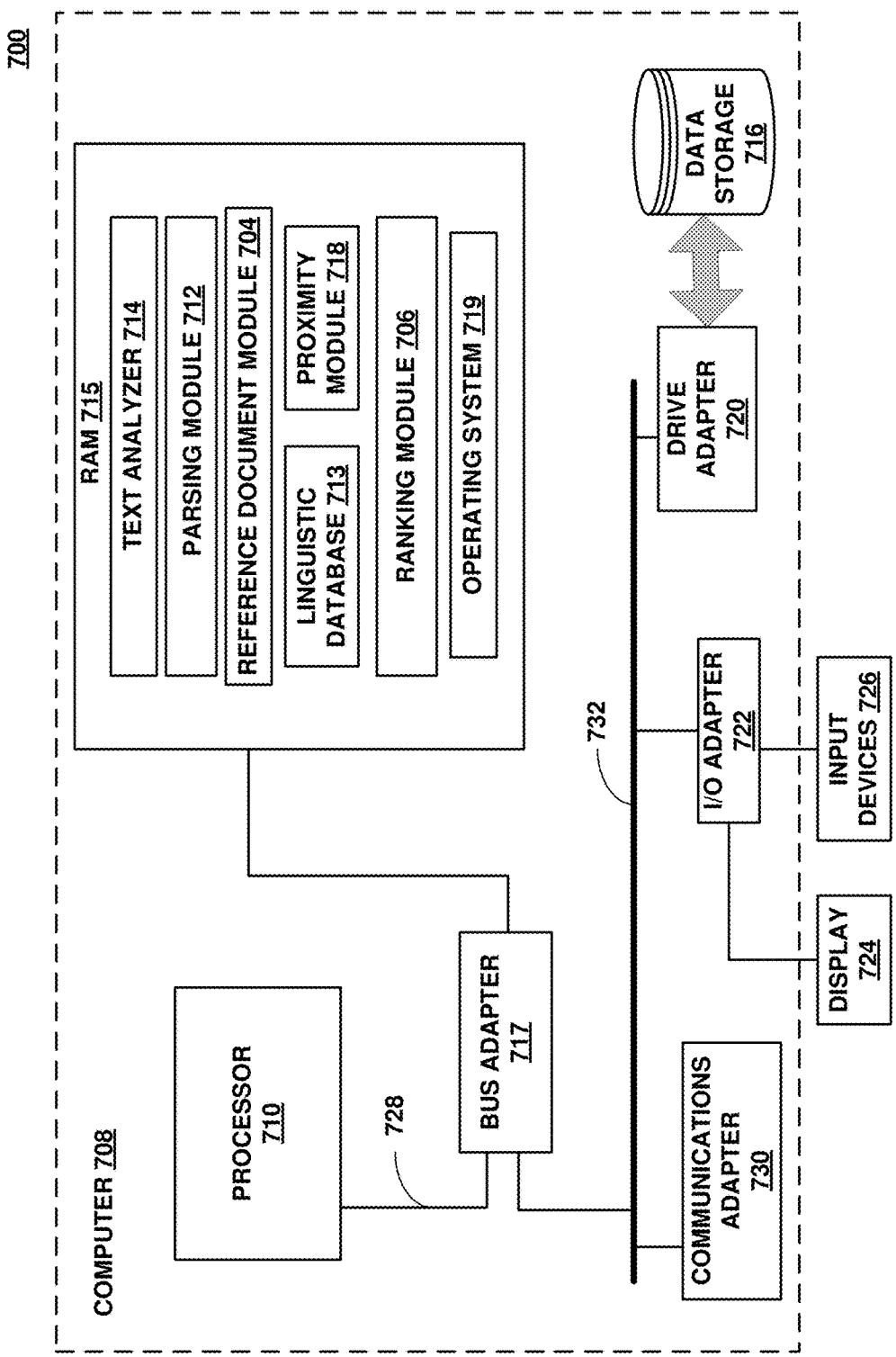
FIG. 7 illustrates a block diagram of automated computing machinery, according to various embodiments.

FIG. 7 illustrates a block diagram of automated computing machinery 500, according to various embodiments.

The computing machinery may include example computer 708 useful in performing aspects of the disclosure, according to various embodiments. The computer 708 of FIG. 5 includes at least one computer processor 710 or central processing unit (CPU) as well as random access memory 715 (RAM) which is connected through bus adapter 717 to processor 710 and to other components of the computer 708. The computing machinery 700 or the processor 710 may include one or more computer processing circuits.

The RAM 715 may include a text analyzer 714, a parsing module 712, a reference document module 704, a linguistic database 713, a proximity module 718, a ranking module 706, and an operating system 719.

The RAM 715, as described herein, may include a text analyzer 714. Texts to be analyzed, texts that have been analyzed, and other related data may be stored to or read from data storage 716, which may be a hard disk drive, according to various embodiments. The parsing module 712 may be in communication with text analyzer 714. The reference document module 704 may be in communication with the text analyzer 714. The linguistic database 713 and the proximity module 718 may be in communication with the reference document module 704, the parsing module 712, and the text analyzer 714. The linguistic database 713 may be internal as shown, or may be in storage externally. The ranking module 706 may be in communication with the linguistic database 713, the proximity module 718, and the text analyzer 714, according to various embodiments.

The RAM 715 may include an operating system 719. The operating system 719 is shown in RAM 715, but many components of such software typically are stored in non-volatile memory also, such as, for example, on a disk drive 716.

The computer 708 may also include disk drive adapter 720 coupled through expansion bus 732 and bus adapter 717 to processor 710 and other components of the computer 708. Disk drive adapter 720 connects non-volatile data storage to the computer 708 in the form of disk drive 716. Disk drive adapters useful in computers include Integrated Drive Electronics ('IDE') adapters, Small Computer System Interface ('SCSI') adapters, Serial AT Attachment ('SATA'), and others. Non-volatile computer memory also may be implemented for as an optical disc drive, electrically erasable programmable read-only memory (so-called 'EEPROM' or 'Flash' memory), RAM drives, etc. The data storage 716 may include one or more storage devices in a tiered or non-tiered configuration.

The example computer 708 may include one or more input/output (I/O) adapters 722. I/O adapters implement user-oriented input/output through, for example, software drivers and computer hardware for controlling output to display devices such as computer display screens 724, as well as user input from user input devices 726 such as keyboards, mice, styli, or touchscreens, according to various embodiments. The example computer 708 may include a video adapter at 722, which is an example of an I/O adapter specially designed for graphic output to a display device 724 such as a display screen or computer monitor. The video adapter (I/O) would be connected to processor 710 through a bus adapter 717, and the front side bus 728, which is also a high-speed bus.

The example computer 708 includes a communications adapter 730 for data communications with other computers, for example, mobile devices, and for data communications with a data communications network. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to best explain the principles of the embodiments, the practical application or technical improvement over technologies found in the marketplace, or to enable others of skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented natural language processing method, comprising:
   receiving, by a processor, a text;
   identifying, by the processor parsing the text using natural language processing system, a set of linguistic characteristics contained in the text, wherein linguistic characteristics include grammatical, syntactic, and idiomatic features of the text, wherein the natural language processing system is trained using training data to match against at least one specific location of origin, and trained to match against at least one specific time period;
   determining a plurality of locations of origin in which the text was potentially written based on the set of linguistic characteristics;
   retrieving a set of reference documents for each location of origin in the plurality of locations of origin, in response to the determining the plurality of locations in which the text was potentially written;
   determining a plurality of time periods in which the text was potentially written based on the set of linguistic characteristics;
   retrieving a set of reference documents for each time period in the plurality of time periods in response to the determining the plurality of time periods in which the text was potentially written;
   producing a set of proximity scores for the text by performing a set of proximity checks using the set of linguistic characteristics, the set of reference documents for each location of origin and for each time period, and the text, wherein the proximity checks analyze usage frequency of the set of linguistic characteristics and geographical closeness of the plurality of locations in the set of linguistic characteristics are to one another, and a temporal closeness of the plurality of time periods in the set of linguistic characteristics between the text and the set of reference documents for each time period are to one another;
   ranking the plurality of locations of origin based on the set of proximity scores;
   ranking the plurality of time periods based on the set of proximity scores; and
   returning, via a user interface, a set of one or more ranked locations of origin of the plurality of locations of origin and a set of one or more ranked time periods of the plurality of time periods.

2. The method of claim 1, wherein producing the set of proximity scores includes:
   producing a first subset of proximity scores by performing a first subset of proximity checks using the set of linguistic characteristics, and the text; and
   producing a second subset of proximity scores by performing a second subset of proximity checks using the set of linguistic characteristics and the set of reference documents for each location.

3. The method of claim 2, wherein ranking the plurality of locations of origin based on the set of proximity scores includes:
   comparing the first subset of proximity scores with the second subset of proximity scores.

4. The method of claim 2, further comprising:
   the first subset of proximity scores and second subset of proximity scores includes a first proximity score determined from a third proximity check comparing how close the locations of the linguistic characteristics are; and
   the first subset of proximity scores and second subset of proximity scores includes a second proximity score determined from a fourth proximity check comparing the how close a placement of the linguistic characteristic is within the text to other linguistic characteristics.

5. The method of claim 2, wherein:
   comparing the first subset of proximity scores with the second subset of proximity scores involves determining a correlation between the first set of reference documents and the text when ranking the locations.

6. The method of claim 1, wherein:
   linguistic characteristics are selected from the group consisting of slang, nouns, jargon, emoticons, hashtags, sources of documents, short hand, writing styles, acronyms, online dictionary and encyclopedia terms, and the language and alphabet.

7. The method of claim 1, wherein:
   the text is selected from the group consisting of social media, literature, government documents, and text books; and
   the reference documents are selected from the group consisting of social media, literature, government documents, and text books.

8. The method of claim 1, wherein producing the set of proximity scores includes:
   producing a first subset of proximity scores by performing a first subset of proximity checks using the set of linguistic characteristics, and the text; and producing a second subset of proximity scores by performing a second subset of proximity checks using the set of linguistic characteristics and the set of reference documents for each time period.

9. The method of claim 8, wherein ranking the plurality of time periods based on the set of proximity scores includes:
comparing the first subset of proximity scores with the second subset of proximity scores.

10. The method of claim 8, further comprising:
the first subset of proximity scores and second set of proximity scores includes a first proximity score determined from a third proximity check comparing how close the time periods of the linguistic characteristics are; and
the first subset of proximity scores and second subset of proximity scores includes a fourth proximity score determined from a second proximity check comparing the how close a placement of the linguistic characteristic is in the text to other linguistic characteristics.

11. The method of claim 8, wherein:
comparing the first subset of proximity scores with the second subset of proximity scores involves determining a correlation between the first set of reference documents and the text when ranking the time periods.

12. The method of claim 1, wherein:
linguistic characteristics are selected from the group consisting of slang, nouns, jargon, emoticons, hashtags, sources of documents, short hand, writing styles, acronyms, online dictionary and encyclopedia terms, and the language and alphabet.

13. The method of claim 1, wherein:
the reference documents are selected from the group consisting of social media, literature, government documents, and text books.

14. A system, comprising one or more computer processors that are configured for natural language processing, wherein the one or more computer processors are configured to:
receive, by the one or more computer processors, a text;
identify, by the one or more computer processors parsing the text using natural language processing system, a set of linguistic characteristics contained in the text, wherein linguistic characteristics include grammatical, syntactic, and idiomatic features of the text, wherein the natural language processing system is trained using training data to match against at least one specific location of origin, and trained to match against at least one specific time period;
determine a plurality of locations of origin in which the text was potentially written based on the set of linguistic characteristics;
retrieve a set of reference documents for each location in the plurality of locations, in response to the determining the plurality of locations in which the text was potentially written;
determine a plurality of time periods in which the text was potentially written based on the set of linguistic characteristics;
retrieve a set of reference documents for each time period in the plurality of time periods in response to the determining the plurality of time periods in which the text was potentially written;
produce a set of proximity scores for the text by performing a set of proximity checks using the set of linguistic characteristics, the set of reference documents for each location of origin and each time period, and the text, wherein the proximity checks analyze usage frequency of the set of linguistic characteristics and geographical closeness of the plurality of locations in the set of linguistic characteristics between the text and the set of reference documents for each location of origin are to one another, and a temporal closeness of the plurality of time periods in the set of linguistic characteristics between the text and the set of reference documents for each time period are to one another;
rank the plurality of locations of origin based on the set of proximity scores;
rank the plurality of time periods based on the set of proximity scores; and
return, via a user interface, a set of one or more ranked locations of origin of the plurality of locations of origin and a set of one or more ranked time periods of the plurality of time periods.

15. The system of claim 14, wherein producing the set of proximity scores includes:
producing a first subset of proximity scores by performing a first subset of proximity checks using the set of linguistic characteristics, and the text; and
producing a second subset of proximity scores by performing a second subset of proximity checks using the set of linguistic characteristics and the set of reference documents for each location.

16. The system of claim 15, wherein ranking the plurality of locations of origin based on the set of proximity scores includes:
comparing the first subset of proximity scores with the second subset of proximity scores.

17. The system of claim 15, wherein the one or more computer processor circuits are further configured to:
the first subset of proximity scores and second subset of proximity scores includes a first proximity score determined from a third proximity check comparing how close the locations of the linguistic characteristics are; and
the first set of proximity scores and second set of proximity scores includes a second proximity score determined from a fourth proximity check comparing the how close a placement of the linguistic characteristic is within the text to other linguistic characteristics.

18. The system of claim 15, wherein:
comparing the first subset of proximity scores with the second subset of proximity scores involves determining a correlation between the first set of reference documents and the text when ranking the time periods.

19. The system of claim 15, wherein:
comparing the first subset of proximity scores with the second subset of proximity scores involves determining a correlation between the first subset of reference documents and the text when ranking the locations.

20. The system of claim 14, wherein:
linguistic characteristics are selected from the group consisting of slang, nouns, jargon, emoticons, hashtags, sources of documents, short hand, writing styles, acronyms, online dictionary and encyclopedia terms, and the language and alphabet.

* * * * *